United States Patent [19]

Tanaka et al.

[11] Patent Number: 4,890,234

[45] Date of Patent: Dec. 26, 1989

[54] NC DATA MODIFICATION METHOD

[75] Inventors: Kunio Tanaka; Yasushi Onishi, both of Tokyo, Japan

[73] Assignee: Fanuc Ltd., Minamitsuru, Japan

[21] Appl. No.: 150,654

[22] PCT Filed: May 12, 1987

[86] PCT No.: PCT/JP87/00295

§ 371 Date: Jan. 7, 1988

§ 102(e) Date: Jan. 7, 1988

[87] PCT Pub. No.: WO87/07046

PCT Pub. Date: Nov. 19, 1987

[30] Foreign Application Priority Data

May 15, 1986 [JP] Japan .................................. 61-111385

[51] Int. Cl.⁴ ...................... G06F 15/46; G05B 19/403
[52] U.S. Cl. ............................ 364/474.23; 318/568.1; 364/192
[58] Field of Search ...................... 364/474.22–474.27, 364/474.36, 191–193, 188, 189; 318/568, 568.1

[56] References Cited

U.S. PATENT DOCUMENTS

| 4,086,633 | 4/1978 | Kishi et al. | 364/474.23 |
| 4,092,720 | 5/1978 | Carey | 364/474.23 |
| 4,484,286 | 11/1984 | Nagamine et al. | 364/474.23 |
| 4,530,046 | 7/1985 | Munekata et al. | 364/474.24 X |
| 4,587,608 | 5/1986 | Kishi et al. | 364/474.23 X |
| 4,591,968 | 5/1986 | Nozawa et al. | 364/474.23 |
| 4,692,872 | 9/1987 | Kiya | 364/474.23 |

Primary Examiner—Joseph Ruggiero
Attorney, Agent, or Firm—Staas & Halsey

[57] ABSTRACT

Preregistered in a memory (103) as conversion tables for storing NC data of a first type into NC data of a second type are a G-code conversion table (GTB) giving the correlation between G codes of the first NC data and G codes of the second NC data, and M-code conversion table (MTB) giving the correlation between M codes of the first NC data and M codes of the second NC data, and a coordinate command code conversion table (PTB) giving the correlation between coordinate command codes (X, Y, Z, I, J, K codes) of the first NC data and second NC data. The format of the first NC data is changed to the format of the second NC data by making use of these conversion tables (GTB, MTB, PTB).

4 Claims, 2 Drawing Sheets

NC DATA MODIFICATION METHOD

TECHNICAL FIELD

This invention relates to a method of modifying NC data and, more particularly, to an NC data modification method through which NC data in a format executable by an NC unit are modified into NC data having a different executable format.

BACKGROUND ART

In automatic programming for creating NC data using an automatic programming language such as APT or FAPT, (a) a part program based on the automatic programming language is created by defining points, straight lines and circular arcs using simple symbols (this is referred to as "figure definition"), and then defining a tool path using the defined points, straight lines and circular arcs (referred to as "motion statement definition"), and (b) the part program based on the automatic programming language is subsequently converted, by using an NC data output table, into NC data comprising NC data (EIA codes or ISO codes) in a format capable of being executed by an NC unit. The NC data output table stores NC data output formats for various commands, such as a linear interpolation command, circular interpolation command and coordinate system setting command. By referring to the table, the part program is converted into NC data in the format to be executed and is then delivered as an output. For example, the following command format for linear interpolation is stored in the table to deal with linear interpolation:

G90/G91
G00/G01
Xx
Yy
Ff
EOB and the following command format for circular interpolation is stored in the table to deal with circular interpolation:

G90/G91
G02/G03
Xx
Yy
Ii
Jj
EOB

There are cases where it is desired to have machining, which is similar to that performed by a first numerically controlled machine tool already in operation, executed by a second numerically controlled machine tool of a type different from that of the first numerically controlled machine tool. If the NC data formats for both of the numerically controlled machine tools are the same when the above is the case, then the second numerically controlled machine tool can be controlled using the NC data of the first numerically controlled machine tool as it is.

If the NC data formats of the two numerically controlled machine tools are different, on the other hand, the NC data output table of the automatic programming apparatus is modified for the sake of the second numerically controlled machine tool, the NC data for the second numerically controlled machine tool are created using the already prepared part program based on the automatic programming language, and the second numerically controlled machine tool is controlled in accordance with these NC data.

However, the conventional method of dealing with NC data formats that differ is a troublesome one since the NC data output table of the automatic programming apparatus must be modified. In addition, there are cases where the part program based on the automatic programming language no longer exists. In such case the conventional method cannot be applied and the NC data form must be modified by a manual operation.

Accordingly, an object of the present invention is to provide an NC data modification method through which NC data having an executable format can be automatically changed to NC data of another type without using a part program based on automatic programming language.

DISCLOSURE OF THE INVENTION

Even if the formats of first NC data and second NC data differ, in most cases they differ only in terms of G codes, M codes or coordinate command codes. Accordingly, a G-code conversion table (GTB) giving the correlation between the G codes of the first NC data and second NC data, an M-code conversion table (MTB) giving the correlation between the M codes of the first NC data and second NC data, and a coordinate command code conversion table (PTB) giving the correlation between coordinate command codes (X, Y, Z, I, J, K codes) of the first NC data and second NC data are preregistered in a memory as conversion tables for converting the first NC data into the second NC data, and the format of the first NC data is changed to the format of the second NC data by making use of these conversion tables (GTB, MTB, PTB).

BEST MODE FOR CARRYING OUT THE INVENTION

Figure 1:
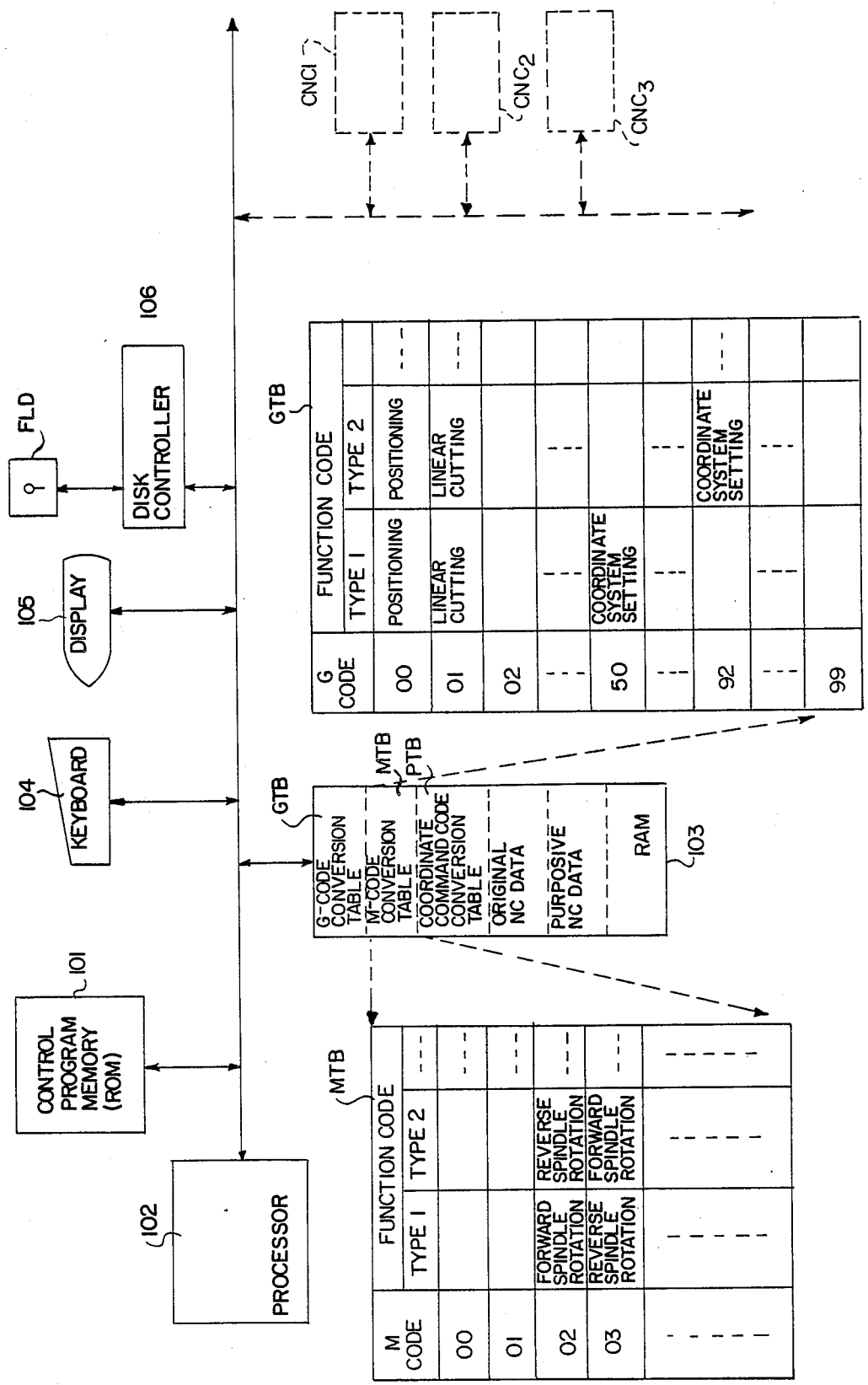
FIG. 1 is a block diagram illustrating an apparatus for realizing the NC data modification method of the present invention.
Figure 2:
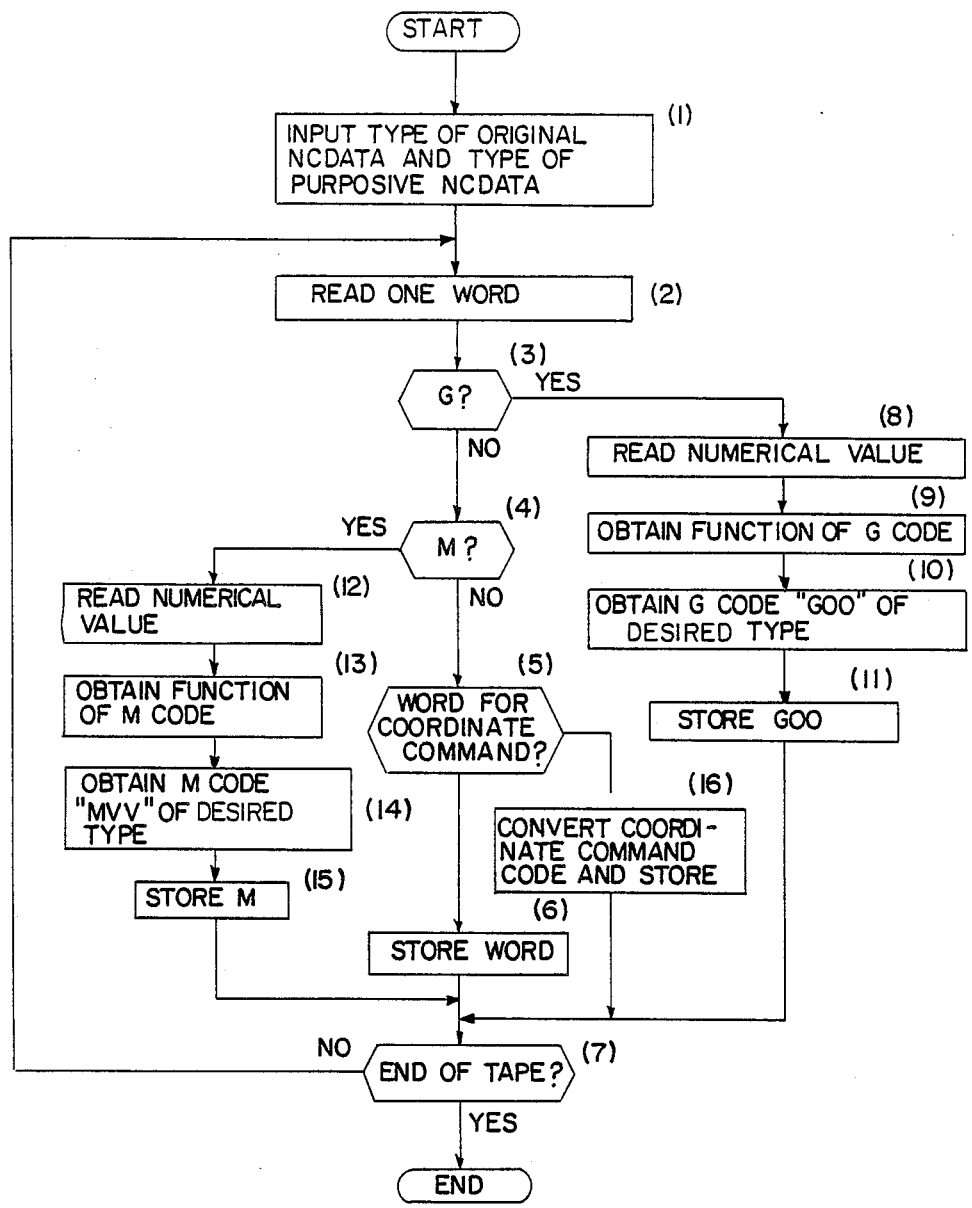
FIG. 2 is a flowchart of processing according to the present invention.

FIG. 1 is a block diagram illustrating an apparatus for realizing the NC data modification method of the present invention, and FIG. 2 is a flowchart of processing according to the present invention.

In FIG. 1, numeral 101 denotes a ROM in which a control program has been stored, 102 a processor for executing NC data modification processing under the control of the control program, and 103 a RAM.

The RAM 103 stores NC data conversion tables for converting NC data having an NC unit-executable format into NC data having another executable format, and also stores read NC data and the results of processing. Stored in the RAM 103 as these conversion tables are a G-code conversion table GTB for converting G codes in certain NC data into G codes in other NC data, an M-code conversion table MTB for converting M codes in certain NC data into M codes in other NC data, and a coordinate command code conversion table PTB for converting coordinate command codes in certain NC data into coordinate command codes in other NC data.

The G-code conversion table GTB indicates the correlation between G codes (G00–G99) and functions in each type of data. The functions, which refer to positioning, linear cutting, circular cutting, coordinate system setting, absolute commands, incremental commands and the like, are expressed by respective codes (function codes) G codes differ depending upon the type of NC data, even if the functions are the same. For example, the G code of coordinate system setting is "G50" in NC data of Type 1 and "G92" in NC data of Type 2.

The M-code conversion table GTB indicates the correlation between M codes (M00–M99) and functions in each type of data. The functions, which refer to forward spindle rotation, reverse spindle rotation, spindle stop, coolant on, coolant off and the like, are expressed by respective codes (function codes). M codes differ depending upon the type of NC data, even if the functions are the same. For example, the M codes of forward spindle rotation and reverse spindle rotation are "M02" and "M03", respectively, in NC data of Type 1 and "M03", "M02", respectively, in NC data of Type 2.

The coordinate command code conversion table PTB indicates the command unit for each axis of X, Y, Z, I, J and K codes, whether a command is absolute or incremental, whether a decimal point is present, etc. For example, to command 1 mm of movement along the X axis, "X1000" is the command in the NC data of Type 1 and "X10000" is the command in the NC data of Type 2.

Numeral 104 denotes a keyboard, 105 a display unit, and 106 a disc controller. FLD represents a floppy. NC data are stored on the floppy FLD.

The NC data modification method of the present invention will now be described in accordance with the flowchart shown in FIG. 2.

(1) The floppy FLD storing the original NC data is set in the disc drive of the disc controller 106, and the data are read from the floppy and stored in an NC data storage area of the RAM 103.

The type of the original NC data (assumed to be Type 1) and the type of the NC data to be obtained by the conversion (assumed to be Type 2) are inputted from the keyboard 104, and a conversion execution command is inputted from the keyboard.

(2) In response, the processor 102 reads the original NC data out of the RAM 103 one word at a time and executes the following processing under the control of the control program:

(3) First, the processor checks whether the read word is the alphabetic character G.

(4) If the word is not G, it is checked whether the word is the alphabetic character M.

(5) If the word is not M either, it is checked whether the word is a word address word (e.g. X, Y, Z, I, J, K) commanding a coordinate value.

(6) If the answer received at step (5) is NO, then the word read at step (2) is stored in the RAM 103 in a storage area that is for storing the(purposive NC data.

(7) Thereafter, it is checked whether this is the end of the NC data. If it is, then processing is terminated; if it is not, then processing is executed from step (2) onward. It should be noted that the end of data is indicated if M02 (program end) or M30 (tape end) is identified.

(8) If the word read is determined at step (3) to be the alphabetic character G, then the processor 102 goes to the RAM 103 to read the two-digit numerical value ▢▢ that follows the alphabetic character G. It is assumed here that ▢▢ is 50.

(9) Next, the processor refers to the G-code table GTB to obtain the function of G▢▢(=G50) in the original data (i.e. the function in the NC data of Type 1). Note that the function of G50 is the coordinate system setting function.

(10) When the function has been found, the processor goes to the G-code conversion table GTB to obtain the G code (G00) in the desired NC data (the NC data of Type 2) conforming to the abovementioned function. In this example, G00 is G92.

(11) Thereafter, G00 is stored in the RAM 103 in the desired NC data storage area thereof, after which processing is executed from step (7) onward.

(12) If the decision rendered at step (4) is that the read word is the alphabetic character M, then the processor 102 goes to the RAM 103 to read the two-digit numerical value ΔΔ that follows the alphabetic character M.

(13) Next, the processor refers to the M-code table MTB to obtain the function of MΔΔ in the original data (the NC data of Type 1).

(14) When the function has been found, the processor goes to the M-code conversion table MTB to obtain the M code (M∇∇) in the desired NC data (the NC data of Type 2) conforming to the abovementioned function.

(15) Thereafter, the M code (M∇∇) is stored in the RAM 103 in the desired NC data storage area thereof, after which processing is executed from step (7) onward.

(16) If the decision rendered at step (5) is that the read word is a word address word for a coordinate value command, then the processor 102 goes to the RAM 103 to read the numerical value that follows the alphabetic character, thereafter refers to the coordinate command code conversion table PTB to convert the code into the Type 2 coordinate command code, then stores this code in the RAM 103 in the desired NC data storage area thereof and thereafter executes processing from step (7) onward.

When NC data of Type 2 have thus been obtained from NC data of Type 1, these data are outputted to a floppy or other external storage medium.

It should be noted that an automatic programming apparatus or an NC unit can be provided with the abovementioned functions. If an NC unit is provided with these functions, NC control can be executed while the data conversion is made one block at a time.

In a case where a plurality of numerically controlled machine tools are to be subjected to direct control (group management control), then numerically controlled machined tools that differ from one another (see CNC1, CNC2, ... in FIG. 1) can be made to execute the same NC machining simultaneously with one type of NC data if a central host computer is provided with the abovementioned functions.

The foregoing relates to a case where the correlation between G or M codes and functions is registered for NC data of each type. However, it is possible to adopt an arrangement in which, in a combination of all types of NC data, a correlation is stored between G codes of NC data of a certain type and G codes of NC data of another type.

Further, the foregoing relates to a case where all tables are stored, namely the G-code conversion table, M-code convertion table and coordinate command code conversion table. However, it is permissible to store only one of these tables or to store other conversion tables.

In accordance with the present invention as described above, the arrangement is such that conversion tables for converting first NC data into second NC data are preregistered, and the format of the first NC data is changed into the format of the second NC data by using these tables. Accordingly, the invention is useful in that NC data can be changed automatically to NC data having a different data format without using a part program based on automatic programming language.

We claim:

1. A numerical control (NC) data modification method for changing first NC data to second NC data of a different type, comprising the steps of:
   storing a conversion table having at least one of a G-code conversion table for converting G codes in the first NC data into G codes in the second NC data and an M-code conversion table for converting M codes in the first NC data into M codes in the second NC data,
   detecting at least one of a G-code and an M-code in the first NC data, and
   converting the detected code in the first NC data to a corresponding code in the second NC data in accordance with said conversion table.

2. An NC data modification method according to claim 1, wherein said G-code conversion table is a correlation between G codes and functions in NC data of each type and said M-code conversion table is a correlation between M codes and functions in NC data of each type, and wherein said step of converting includes the substeps of:
   determining the function associated with the detected code using at least one of the G-code conversion table and the M-code conversion table;
   identifying a function in the second NC data and the associated one of the G-code and M-code, that corresponds to the determined function; and
   replacing at least one of the G-code and the M-code in the first NC data with the identified code in the second NC data corresponding to the determined function.

3. An NC data modification method according to claim 1, wherein said conversion table has a coordinate command code conversion table for converting coordinate command codes in the first NC data into coordinate command codes in the second NC data, said method further comprising the steps of:
   locating coordinate command codes in the first NC data; and accordance with the coordinate command code conversion table.

4. An NC data modification method according to claim 3, characterized in that said coordinate command code table is a correlation between controlled axes and command units along said axes in each type of NC data.

* * * * *

UNITED STATES PATENT AND TRADEMARK OFFICE
CERTIFICATE OF CORRECTION

PATENT NO. : 4,890,234
DATED : December 26, 1989
INVENTOR(S) : Kunio Tanaka et al.

It is certified that error appears in the above-identified patent and that said Letters Patent is hereby corrected as shown below:

Col. 6, Claim 3, line 22, after "and" insert

--converting the located coordinate command codes to corresponding command codes in the second NC data in--.

Signed and Sealed this

Twenty-fifth Day of December, 1990

Attest:

HARRY F. MANBECK, JR.

*Attesting Officer*  *Commissioner of Patents and Trademarks*